United States Patent [19]
Taubitz et al.

[11] Patent Number: 4,957,965
[45] Date of Patent: Sep. 18, 1990

[54] THERMOPLASTIC MOLDING MATERIALS

[75] Inventors: Christof Taubitz, Wachenheim; Klaus Muehlbach, Heppenheim; Hermann Brandt, Schifferstadt; Klaus Boehlke, Hessheim, all of Fed. Rep. of Germany

[73] Assignee: BASF Aktiengesellschaft, Ludwigshafen, Fed. Rep. of Germany

[21] Appl. No.: 228,720

[22] Filed: Aug. 5, 1988

[30] Foreign Application Priority Data

Aug. 7, 1987 [DE] Fed. Rep. of Germany ....... 3726283

[51] Int. Cl.$^5$ ..................... C08L 71/12; C08L 77/00
[52] U.S. Cl. ..................... 525/66; 524/140; 524/508; 525/68; 525/92; 525/391; 525/397; 525/905
[58] Field of Search ............ 525/66, 397, 905, 68, 525/92

[56] References Cited

U.S. PATENT DOCUMENTS 3,379,792 4/1968 Finholt ........................... 260/857
4,654,405 3/1987 Jalbert et al. .................... 525/397

FOREIGN PATENT DOCUMENTS 0046040 2/1982 European Pat. Off. .
0024120 4/1983 European Pat. Off. .
0226910 7/1987 European Pat. Off. .
59-66452 5/1984 Japan .
2054623 2/1981 United Kingdom .
8700540 1/1987 World Int. Prop. O. .

Primary Examiner—Jacob Ziegler
Attorney, Agent, or Firm—Keil & Weinkauf

[57] ABSTRACT

Thermoplastic molding materials contain, as essential components, (A) 5–95% by weight of a polyamide;
(B) 5–95% by weight of a modified polyphenylene ether, prepared from
  ($b_1$) 4.95–99.9% by weight of a polyphenylene ether,
  ($b_2$) 0–90% by weight of a vinylaromatic polymer,
  ($b_3$) 0.05–10% by weight of one or more compounds from the group consisting of
    ($b_{31}$) an $\alpha,\beta$-unsaturated dicarbonyl compound,
    ($b_{32}$) a monomer containing amide groups and a polymerizable double bond and
    ($b_{33}$) a monomer containing lactam groups and a polymerizable double bond,
  ($b_4$) 0–80% by weight of further graft-active monomers and
  ($b_5$) 0.01–0.09% by weight of a free radical initiator,
(C) 0–90% by weight of an unmodified polyphenylene ether,
(D) 0–45% by weight of a vinylaromatic polymer and
(E) 0–40% by weight of a rubber impact modifier.

4 Claims, No Drawings

THERMOPLASTIC MOLDING MATERIALS

The present invention relates to novel thermoplastic molding materials containing, as essential components,
(A) 5–95% by weight of a polyamide,
(B) 5–95% by weight of a modified polyphenylene ether, prepared from
($b_1$) 4.95–99.9% by weight of a polyphenylene ether,
($b_2$) 0–90% by weight of a vinylaromatic polymer,
($b_3$) 0.05–10% by weight of one or more compounds from the group consisting of
($b_{31}$) an $\alpha,\beta$-unsaturated dicarbonyl compound,
($b_{32}$) a monomer containing amide groups and a polymerizable double bond and
($b_{33}$) a monomer containing lactam groups and a polymerizable double bond,
($b_4$) 0–80% by weight of further monomers capable of grafting and
($b_5$) 0.01–0.09% by weight of a free radical initiator,
(C) 0–90% by weight of an unmodified polyphenylene ether,
(D) 0–45% by weight of a vinylaromatic polymer and
(E) 0–40% by weight of a rubber impact modifier,
the percentages (A)–(E) and ($b_1$)–($b_5$) each summing to 100%.

The present invention furthermore relates to a process for the preparation of such molding materials and their use for the production of moldings and the moldings produced therefrom.

Polyphenylene ethers (PPE) are plastics which have very good thermal, mechanical and electrical properties but only very poor resistance to solvents. This also applies to a commercial blend of polyphenylene ether and styrene polymers. The usefulness of such products is therefore limited.

U.S. Pat. No. 3,379,792 discloses that the melt flow properties of polyphenylene ethers are improved by adding up to 25% by weight of a polyamide. This patent also states that, when more than 20% by weight of polyamide are added, other properties of the polyphenylene ether are very adversely affected.

GB-A No. 2 054 623 has, moreover, disclosed blends of polyphenylene ethers and polyamides having a high polyamide content; however, in order to obtain good properties, it is necessary to carry out a fairly long mixing process in the melt. Heating at such high temperatures for relatively long periods, however, readily produces degradation.

EP-A No. 24 120 and EP-A No. 46 040 described blends of polyamides, unmodified polyphenylene ethers and maleic anhydride and/or maleimide or their copolymers with styrene. The materials described in these patents and the moldings produced therefrom have unsatisfactory impact strength, particularly when rubber is used as an additional component, and a melt flow index (MFI) which is much too low for many intended uses.

JP-A No. 59/66452 discloses blends of polyphenylene ethers and polyamides, which contain a PPE which is modified with carboxylic acids or their derivatives and is prepared in the presence of not less than 0.1, preferably 0.3–5, % by weight of a free radical initiator. Such large amounts of free radical initiators lead to undesirable side reactions, in particular frequently to crosslinking, which adversely affect the properties of the products.

WO-A No. 87/0540 (PPE) and EP-A No. 226 910 disclose molding materials based on polyphenylene ethers and polyamides, which contain a modified PPE which is prepared by reacting PPE with compounds which contain a C=C double bond and a functional acid group. According to this publication, it is essential to carry out the procedure in the absence of free radical initiators. The products obtained in this manner are in general not completely satisfactory, since the compounds used for modifying the PPE do not undergo a defined reaction with the PPE, forming a plurality of different modified polyphenylene ethers which have different compatibilities with the added polyamide, which may adversely affect the mechanical properties of the materials.

It is an object of the present invention to provide thermoplastic molding materials which, in addition to good processibility, have good thermal, mechanical and dielectric properties as well as high impact strength (including multiaxial impact strength) and a pale natural color.

We have found that this object is achieved, according to the invention, by the thermoplastic molding materials defined at the outset.

Preferred materials of this type are described in the subclaims.

The novel molding materials contain, as component A, from 5 to 95% by weight of one or more polyamides. Linear polyamides, for example those having a relative viscosity of from 2.5 to 4.5, measured in 1% strength by weight solution in 96% strength by weight sulfuric acid at 23° C., are suitable. Preferred polyamides are those derived from lactams having from 7 to 13 ring members, such as polycaprolactam, polycapryllactam or polylaurolactam, and polyamides which are obtained by reacting dicarboxylic acids with diamines. Examples of suitable dicarboxylic acids are alkanedicarboxylic acids of 6 to 12, in particular 6 to 10, carbon atoms and terephthalic acid and isophthalic acid as well as any mixtures of these acids.

Examples of diamines are alkanediamines of 6 to 12, in particular 6 to 8, carbon atoms, and m-xylylenediamine, bis-(4-aminophenyl)-methane, bis-(4-aminocyclohexyl)-methane or 2,2-bis-(4-aminophenyl)-propane and mixtures of these.

It is also possible, and sometimes advantageous, to use blends of the stated polyamides. Nylon 6 (polycaprolactam), nylon 66 (polyhexamethyleneadipamide) and polyamides synthesized from hexamethylenediamine and isophthalic acid or terephthalic acid have become particularly important industrially.

In a particularly preferred embodiment, the component A used is a polyamide which consists of not less than 80% by weight of repeating units of the general formula V

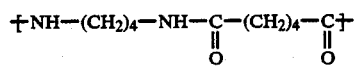

Polyamides of this type are obtainable, for example, by condensation of 1,4-diaminobutane with adipic acid at elevated temperatures. Preparation processes for polyamides having this structure are described in, for example, EP-A- No. 39 094, EP-A-No. 38 582 and EP-A-No. 39 524.

Such products which contain polyamides of the above structure (nylon 4,6) have, in particular, good impact strengths and a pale natural color.

Preferred molding materials contain from 5 to 80, in particular from 25 to 70, % by weight of thermoplastic polyamides.

The novel molding materials contain, as component B, from 5 to 95, preferably from 20 to 95, in particular from 30 to 65, % by weight of one or more modified polyphenylene ethers, which are prepared from the components $b_1$, $b_2$, $b_3$, $b_5$ and, if required, $b_4$.

Modification is intended to mean a change in ($b_1$) and ($b_2$) brought about by the reaction of the components ($b_1$) to ($b_5$).

Component $b_1$ is a conventional polyphenylene ether which can be prepared from phenols disubstituted in the o-position, for example by oxidative coupling. Preferably used polyphenylene ethers are those which are compatible with vinylaromatic polymers, i.e. completely or substantially soluble in these polymers (cf. A. Noshay, Block Copolymers, pages 8–10, Academic Press, 1977 and O. Olabisi, Polymer-Polymer Miscibility, 1979, pages 117–189).

The amount of component ($b_1$) is from 4.95 to 99.9, preferably from 10 to 99.9, in particular from 50 to 90, % by weight, based on the sum of the components ($b_1$) to ($b_5$).

The polyphenylene ethers used generally have a weight average molecular weight of from 10,000 to 80,000, preferably from 15,000 to 60,000.

A few polyphenylene ethers, as stated, inter alia, in O. Olabisi, loc. cit., pages 224–230 and 245, may be mentioned here merely by way of example, such as poly-(2,6-diethyl-1,4-phenylene) oxide, poly-(2-methyl-6-ethyl-1,4-phenylene) oxide, poly-(2-methyl-6-propyl-1,4-phenylene) oxide, poly-(2,6-dipropyl-1,4-phenylene) oxide, poly-(2-ethyl-6-propyl-1,4-phenylene) oxide, preferably poly-(2,6-dimethyl-1,4-phenylene) oxide, or copolymers such as those which contain 2,3,6-trimethylphenol, as well as polymer blends. However, poly-(2,6-dimethyl-1,4-phenylene) oxide is particularly preferred.

Component ($b_2$), which may be used in the synthesis of the modified polyphenylene ether, is a vinylaromatic polymer which is preferably compatible with the polyphenylene ether used.

The weight average molecular weight of these polymers is in general from 1,500 to 2,000,000, preferably from 70,000 to 1,000,000.

Examples of preferred vinylaromatic polymers which are compatible with the polyphenylene ethers are described in the abovementioned monograph by Olabisi, pages 224–230 and 245. Vinylaromatic polymers of styrene, chlorostyrene, α-methylstyrene and p-methylstyrene may be mentioned here merely as typical examples; comonomers, such as (meth)acrylonitrile or (meth)acrylates, may also be used in the synthesis in minor amounts (preferably not more than 20, in particular not more than 8, % by weight). A particularly preferred vinylaromatic polymer is polystyrene. Blends of these polymers can of course also be used.

Processes for the preparation of such vinylaromatic polymers are known per se and are described in the literature, so that further information is unnecessary here.

Mass, suspension, emulsion and solution polymerization may be mentioned here merely as examples of suitable polymerization processes.

The amount of the vinylaromatic polymer ($b_2$) in component (B) is from 0 to 90, preferably from 0 to 70, in particular from 0 to 60, % by weight.

When fumaric acid is used as component ($b_3$), it has frequently proven advantageous if the molding materials have a certain minimum content of vinylaromatic polymer ($b_2$), preferably not less than 1.95, in particular not less than 4.95, % by weight, based on component (B).

The modified polyphenylene ether (B) contains, as essential component ($b_3$), one or more of the compounds ($b_{31}$) to ($b_{33}$).

Mixtures of different compounds ($b_{31}$) to ($b_{33}$) may also be used, but it is generally advantageous to use only one of these types of compounds.

($b_{31}$) is an α,β-unsaturated dicarbonyl compound. The amount of ($b_{31}$) is from 0.05 to 10, preferably from 0.1 to 5, % by weight, based on the sum of components ($b_1$) to ($b_5$).

These may be
(a) acids and their anhydrides,
(b) imides,
(c) half-esters and half-amides and
(d) diesters and diamides.

Examples of α,β-unsaturated dicarboxylic acids or their anhydrides (a) are maleic acid, fumaric acid, itaconic acid, tetrahydrophthalic acid, citraconic acid, maleic anhydride, itaconic anhydride, gluconic anhydride, citraconic anhydride and tetrahydrophthalic anhydride. Fumaric acid is particularly preferred.

Suitable imides (b) are maleimides of the general formula I

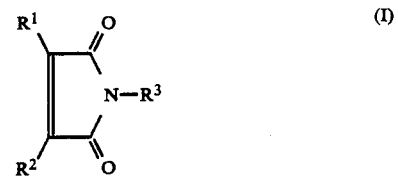

where $R^1$, $R^2$ and $R^3$ are each hydrogen or an alkyl, alkoxy, cycloalkyl, alkenyl, aryl, arylene or alkylene group of 1 to 12 carbon atoms.

$R^1$, $R^2$ and $R^3$ are each preferably hydrogen or alkyl of 1 to 4 carbon atoms, e.g. methyl, ethyl, n-butyl, isobutyl or tert-butyl, cycloalkyl of not more than 8 carbon atoms or phenyl which is unsubstituted or alkyl-substituted or alkoxy-substituted.

N-methylmaleimide, N-butylmaleimide, N-cyclohexylmaleimide, N-phenylmaleimide, N-(p-methylphenyl)-maleimide, N-(3,5-dimethylphenyl)-maleimide, N-(p-methoxyphenyl)-maleimide, N-benzylmaleimide, N-(1-naphthyl)-maleimide and mixtures of these may be mentioned merely as examples of preferred maleimides. Among these, N-phenylmaleimide is particularly preferred.

The half-esters and half-amides (c) are half-esters or half-amides of α,β-unsaturated dicarboxylic acids. Examples of preferred dicarboxylic acids are maleic acid, fumaric acid, chloromaleic acid, dichloromaleic acid, methylmaleic acid and tetrahydrophthalic acid, of which maleic acid and fumaric acid are particularly preferred.

For the preparation of the half-esters or half-amides used according to the invention, these acids or their anhydrides can be reacted with the corresponding alcohols or amines, respectively. Appropriate processes are known per se and are described in the literature, so that further information is unnecessary here.

Primary and secondary monoalcohols, such as methanol, ethanol, n-propanol, isopropanol, n-butanol, isobutanol, pentanols, hexanols, heptanols, octanols, e.g. 2-ethylhexyl alcohol, and higher alcohols, such as dodecanols, and cycloaliphatic alcohols, e.g. cyclohexanol, are preferably used as alcohols for the preparation of the half-esters. Alcohols having aromatic structural units, e.g. benzyl alcohol, are also suitable. In addition to C, H and O, the alcohols may furthermore contain hetero atoms, such as N, S or Si, in the main chain or as substituents. Finally, alcohols having keto groups in the chain or having halogen substituents are also suitable. However, alkanols of 1 to 6 carbon atoms are preferred.

Examples of amines for the preparation of the half-amides used according to the invention are, very generally, secondary amines and N-alkylanilines. Examples of these are N-methyl- and N-ethylalkylamines and N-methylaniline. As in the case of the alcohols, the amines too may contain hetero atoms and functional groups.

Very generally, the half-esters are preferred to the half-amides.

Molding materials which contain half-esters or half-amides of $\alpha,\beta$-unsaturated dicarboxylic acids frequently have particularly good flow properties, i.e. particularly high melt flow indices (MFI) and a pale natural color.

A diester or diamide of an $\alpha,\beta$-unsaturated dicarboxylic acid (d) can also be used as component (b$_3$).

The diesters and diamides may be derived from the $\alpha,\beta$-unsaturated dicarboxylic acids, alcohols and amines stated in the case of the half-esters and half-amides, so that no further explanations are required here. Dimethyl fumarate and dimethyl maleate are preferred.

Experiments to date have shown that the use of diesters (d) frequently leads to a very constant melt viscosity during prolonged heating of the novel molding materials.

Other suitable components (b$_3$) are monomers containing amide groups and one or more polymerizable double bonds ((b$_{32}$), preferably those of the general formula II

(II)

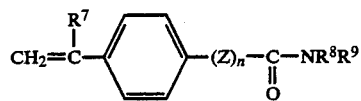
(III)

where R$^4$, R$^5$, R$^6$, R$^7$, R$^8$ and R$^9$ are each hydrogen, an alkyl or alkoxy group of 1 to 12 carbon atoms, cycloalkyl of not more than 12 carbon atoms or aryl, Z is alkylene of 1 to 12 carbon atoms and n is 0 or 1, preferably 0.

Preferred substituents R$^5$, R$^6$, R$^8$ and R$^9$ are alkyl of 1 to 10 carbon atoms, cycloalkyl of not more than 8 carbon atoms or aryl, preferably phenyl. R$^4$ and R$^7$ are each preferably H or methyl.

Acrylamide, N-methyl-, N-ethyl-, N-propyl-, N-butyl-, N-pentyl-, N-hexyl-, N-heptyl-, N-octyl-, N-nonyl-and N-(2-ethylhexyl)-acrylamide, N-cyclohexylacrylamide, N-phenylacrylamide, the corresponding N,N derivatives, such as N,N-dimethylacrylamide, and the corresponding methacrylamides and mixtures of these may be mentioned as examples here.

Acrylamide, methacrylamide, N-phenylacrylamide and N-phenylmethacrylamide are preferably used.

The amount of component (b$_{32}$) is from 0.05 to 10, preferably from 0.1 to 10, in particular from 1 to 5, % by weight, based on the sum of the components (b$_1$) to (b$_5$).

Another suitable component (b$_3$) is a monomer containing lactam groups and one or more polymerizable double bonds ((b$_{33}$).

Preferably used compounds are lactams of the general structure IV

(IV)

where X is a straight-chain or branched alkylene group of 2 to 15 carbon atoms and Y is of the general formula

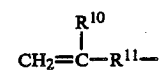

where R$^{10}$ is hydrogen or an alkyl or alkoxy group of 1 to 4 carbon atoms and R$^{11}$ is a divalent substituent

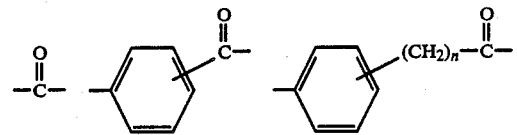

where n is an integer from 1 to 4.

Preferred substituents Y are, very generally, vinyl, acryloyl or methacryloyl radicals or radicals having a basic styrene structure.

Particularly preferred lactam units are those which are polymerizable or copolymerizable to give polyamides, as described in Houben-Weyl, Methoden der organ. Chemie, Volume X/2, (1958), pages 511–587, and Volume XIV/2, pages 111–131.

Examples are the following: $\beta$-propiolactams (azetidin-2-ones), such as

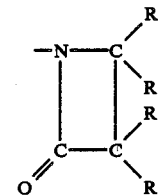

where the radicals R are identical or different alkyl groups of 1 to 6 carbon atoms or hydrogen. Compounds of this type are described in R. Graf, Angew. Chem. 74 (1962), 523–530, and H. Bastian, Angew. Chem. 80 (1968), 304–312.

3,3'-dimethyl-3-propiolactam may be mentioned merely as a typical example of this group.

Other preferred lactam units are 2-methylpyrrolidones

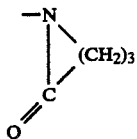

ε-caprolactam, such as

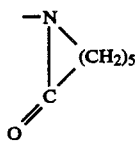

and also 7-enantholactam, 8-capryllactam and 12-laurolactam, as described in K. Dachs, Angew. Chem. 74 (1962), 540–545. 2-Pyrrolidones and ε-caprolactams are very particularly preferred.

Mixtures of these compounds can also be used.

The lactam units are preferably incorporated into the polyphenylene ether B via a carbonyl group on the nitrogen, as shown in general terms below.

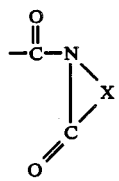

N-(meth)acryloyl-ε-caprolactam

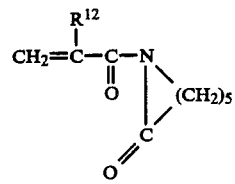

where $R^{12}$ is hydrogen or methyl, may be mentioned here as one particularly preferred example of a component ($b_{33}$)

The amount of component ($b_{33}$) is from 0.05 to 10, preferably from 0.1 to 10, in particular from 0.5 to 5, % by weight, based on the sum of the components ($b_1$) to ($b_5$).

If necessary, other comonomers ($b_4$) which, under the preparation conditions, react with the components ($b_1$) and, where relevant, ($b_2$) or are grafted to these components can also be used in the preparation of the modified polyphenylene ether B. Examples of these are acrylic acid, methacrylic acid, acrylates, methacrylates and vinylaromatic monomers, such as styrene, α-methylstyrene and vinyltoluene, to mention but a few.

The amount of component ($b_4$) is from 0 to 80, preferably from 0 to 45, in particular not more than 20, % by weight, based on the sum of components ($b_1$) to ($b_5$). Particularly preferred molding materials are those which do not contain component ($b_4$).

From 0.01 to 0.09, preferably from 0.02 to 0.08, in particular from 0.03 to 0.07, % by weight of a free radical initiator is used as component ($b_5$) in the preparation of the modified polyphenylene ether (B).

The amount of component ($b_5$) is, as a rule, less than the sum of the amounts of components ($b_3$) and ($b_4$).

In principle, the compounds known for this purpose and described in the literature (e.g. J. K. Kochi, Free Radicals, J. Wiley Publishers, New York 1973) can be used as free radical initiators.

In some cases, it has proven advantageous to use free radical initiators whose half life is sufficiently long to ensure that a significant amount of active free radical initiator is present at the time when the PPE has melted.

As a result, components ($b_{31}$) and ($b_{33}$) can undergo a relatively well defined reaction with the PPE activated by the free radical initiator and can modify the said PPE.

It is not entirely clear at which point in the PPE molecule the free radical initiator attacks; however, initial discoveries indicate that the activation of the PPE takes place at the methyl substituent in the o-position to the oxygen atom and the components ($b_{31}$) to ($b_{33}$) accordingly also attack predominantly in this position.

Examples of free radical initiators are: di-(2,4-dichlorobenzoyl) peroxide, tert-butyl peroxide, di-(3,5,5-trimethylhexanol) peroxide, dilauroyl peroxide, didecanoyl peroxide, dipropionyl peroxide, dibenzoyl peroxide, tert-butyl peroxy-2-ethylhexanoate, tert-butyl peroxydiethylacetate, tert-butyl peroxyisobutyrate, 1,1-di-tert-butyl peroxy-3,3,5-trimethylcyclohexane, tertbutyl peroxyisopropylcarbonate, tert-butyl peroxy-3,3,5-trimethylhexanoate, tert-butyl peracetate, tert-butyl perbenzoate, butyl 4,4-di-tert-butyl peroxyvalerate, 2,2-di-tert-butylperoxybutane, dicumyl peroxide, tert-butyl cumyl peroxide, 1,3-di-(tert-butylperoxyisopropyl)benzene and di-tert-butyl peroxide. Organic hydroperoxides, such as diisopropylbenzene monohydroperoxide, cumene hydroperoxide, tert-butyl hydroperoxide, p-menthyl hydroperoxide and pinane hydroperoxide as well as highly branched alkanes of the general structure

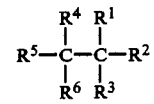

where $R^1$ to $R^6$ independently of one another are each alkyl of 1 to 8 carbon atoms, alkoxy of 1 to 8 carbon atoms, aryl, such as phenyl or naphthyl, or a 5-membered or 6-membered heterocycle having a π-electron system and nitrogen, oxygen or sulfur as hetero atoms, are preferred. The substituents $R^1$ to $R^6$ can in turn contain functional groups as substituents, such as carboxyl, carboxyl derivative, hydroxyl, amino, thiol or epoxide groups.

Examples of these are

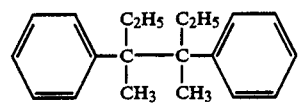

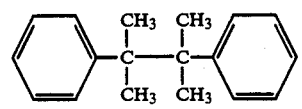

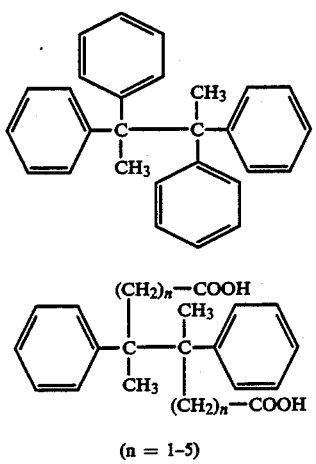

(n = 1-5)

Some of these are commercially available. Good results, particularly with regard to the flow properties of the novel molding materials, are obtained using 3,4-dimethyl-3,4-diphenylhexane (initiator D-407 ® from Akzo Chemie) and using 2,3-dimethyl-2,3-diphenylbutane. Cumene hydroperoxide and tert-butyl peroxide are also preferably used.

For the preparation of the modified polyphenylene ether B, the components ($b_1$) to ($b_5$) can be reacted with one another at from 250° to 350° C., preferably from 270° to 350° C. Extruders are particularly suitable for this purpose since in general thorough mixing of the components can be achieved in these. The residence times are in general from 0.5 to 30, preferably from 0.5 to 3, minutes. Twin-screw extruders are particularly suitable for the novel process.

A particularly preferred process variant is described below.

The components ($b_1$) to ($b_5$) are preferably metered in together and melted in a melting zone. The extruder screw in the melting zone preferably contains kneading elements. The melting zone is followed by the reaction zone, which preferably contains kneading elements and additional kneading elements having a downstream backward-conveying thread. A devolatilization zone for removing the volatile components is preferably located upstream of product extrusion. The extruded melt is generally granulated, and the granules are used for producing the molding materials according to the invention.

In principle, the modified polyphenylene ether can also be produced in any reaction vessel which permits the components to react with one another.

It is sometimes advantageous if the novel molding materials contain, as component (C), an unmodified polyphenylene ether. This preferably corresponds to the polyphenylene ether used as component ($b_1$), and reference may therefore be made to the relevant statements on suitable compounds. Where component C is present, its amount is not more than 90, preferably less than 50, % by weight, based on the sum of the components (A) to (E).

The novel molding materials may contain, as further component (D), a vinylaromatic polymer in an amount of not more than 45, preferably not more than 30, % by weight, based on the sum of components (A) to (E). Polymers which are compatible with polyphenylene ethers, as described above for component ($b_2$), are preferred. For further details, reference may therefore be made to the statements on component ($b_2$).

The component (D) can also be toughened. Such polymers are known to the skilled worker as high impact polystyrene (HIPS). For this purpose, the vinylaromatic polymers are prepared in the presence of an impact modifier or are mixed with grafted rubbers. Examples of elastomeric polymers are polybutadiene, styrene/butadiene, styrene-b-butadiene, acrylonitrile/butadiene, ethylene/propylene, polyacrylate and polyisoprene rubbers.

In addition to the grafted rubbers which may be present in component (D), such as polybutadiene, acrylate, styrene/butadiene, polybutene, hydrogenated styrene/butadiene, acrylonitrile/butadiene, ethylene propylene and polyisoprene rubbers, these rubbers may also be added in ungrafted form as component (E). Other rubbers (E) are styrene-grafted ethylene/propylene rubbers, thermoplastic ethylene/propylene rubbers, thermoplastic polyester elastomers, ethylene rubbers and ionomers, styrene/butadiene block copolymers, including AB, ABA, ABA tapered, ABAB, ABAB tapered star block copolymers and the like, similar isoprene block copolymers and (partially) hydrogenated block copolymers.

The component (E) may be present in the novel molding materials in an amount of up to 40, preferably up to 30, % by weight, based on the sum of the components A) to (E).

In addition to the components (A) to (E), the novel thermoplastic molding materials can also contain conventional additives and processing assistants. The amount of these additives is in general not more than 40, in particular not more than 20, % by weight, based on the total weight of components (A) to (E).

Examples of additives are heat stabilizers, light stabilizers, lubricants, mold release agents and colorants, such as dyes and pigments, in conventional amounts. Other additives are reinforcing agents, such as glass fibers, asbestos fibers, carbon fibers and aromatic polyamide fibers, and/or fillers, such as gypsum fibers, synthetic calcium silicates, kaolin, calcined kaolin, wollastonite, talc or chalk, and flameproofing agents, such as phosphorus compounds, e.g. phosphates, phosphoric esters, phosphorous esters, phosphinic esters, phosphonous esters or organic phosphine oxides.

Low molecular weight or high molecular weight polymers are also suitable additives.

The novel thermoplastic molding materials are advantageously obtained by mixing the individual components at from 250° to 320° C. in a conventional mixing apparatus, such as a kneader, a Banbury mixer or a single-screw extruder, but preferably in a twin-screw extruder. In order to obtain a very homogeneous molding material, thorough mixing is necessary. The sequence in which the components are mixed may be varied; for example, two or, if necessary, three components can be premixed or all the components can be mixed together.

It should be mentioned that, during the preparation of the molding material, a reaction may sometimes occur between the components (A) to (E), so that the end product does not consist of a pure mixture of these components.

The novel molding materials are distinguished by their balanced properties, such as their good impact strength (including multiaxial impact strength) together with good flow properties. Their pale natural color is also noteworthy.

They are particularly suitable for the production of moldings by injection molding or extrusion.

EXAMPLES 1 TO 9

Preparation of modified polyphenylene ether B $B_1$: 78.5% by weight of poly-(2,6-dimethyl-1,4-phenylene ether) (PPE) having a relative viscosity of 0.63 (measured in 1% strength by weight solution in $CHCl_3$ at 25° C.), 20% by weight of polystyrene (PS 144 C, melt flow index MFI at 200° C./5 kg load=24 g/10 min), 1.45% by weight of fumaric acid and 0.05% by weight of tertbutyl hydroperoxide were metered into a twin-screw extruder (ZSK 53 from Werner & Pfleiderer), melted in a first zone using kneading elements at 255° C., reacted in a second zone with kneading and the use of kneading elements at 265° C. and then devolatilized in a devolatilization zone at 255° C. by reducing the pressure. The mean residence time in the extruder was 2.5 minutes. The emerging melt was passed through a water bath, granulated and dried. The granules had a fumaric acid content of 0.9% by weight and a pale yellow color.

$B/V_1$: For comparison, a modified PPE was prepared from 97.5% by weight of polyphenylene ether (as in $B_1$) and 2.5% by weight of fumaric acid in the manner described for the preparation of $B_1$.

$B/V_2$: A modified PPE prepared from 85% by weight of PPE, 10% by weight of polystyrene, 2.5% by weight of fumaric acid and 1.5% by weight of dicumyl peroxide (PPE and polystyrene were identical with the products used in the preparation of ($B_1$) was used as the second comparison product. The fumaric acid content was 0.9% by weight and the product was brown.

The following products were used as components A, C, D and E:

Component $A_1$:

Nylon 6 (polycaprolactam) having a weight average molecular weight of 38,000.

Component $C_1$:

Poly-(2,6-dimethyl-1,4-phenylene ether) having a relative viscosity of 0.63 (measured in 1% strength by weight solution in $CHCl_3$ at 25° C.).

Component D:

High impact polystyrene (HIPS) containing 8% by weight of butadiene (Buna CB NX 529 C from Bayer, prepared by anionic polymerization) and having a melt flow index (200° C./5.0 kg) of 15 g/10 min.

Component E:

Styrene/butadiene/styrene three-block copolymer having a styrene content of 30% by weight (Cariflex ® TR 1102 from Shell).

For the preparation of the molding materials in Examples 1–5, 7–16 and 17–20, the components (A) to (E) and ($B/V_1$) and ($B/V_2$) as shown in Table 1 were mixed in a twin-screw extruder as, the molding materials were granulated and the granules were processed to moldings by injection molding.

THe molding materials in Comparative Examples 6 and 17 were prepared in a similar manner, except that no modified polyphenylene ether was used. Some of the products obtained were highly crosslinked, were difficult to process and could not be granulated.

The results of the impact strength and notched impact strength measurements are shown in Table 1.

TABLE 1

| Example No. | % by weight | | | | | DIN 53453 | DIN 53453 | |
|---|---|---|---|---|---|---|---|---|
| | PA $A_1$ | mod. PPE B | PPE $C_1$ | PS D | Rubber E | Impact strength $kJ/m^2$ (23° C.) | Notched impact strength $kJ/m^2$ (23° C.) | Color |
| 1 | 60 | 40 $B_1$ | — | — | — | 29.3 | 4.1 | pale yellow |
| 2* | 54.5 | — | 45.5 | — | — | 8.2 | 0.4 | pale yellow |
| 3* | 48.2 | 39.5 $B/V_1$ | — | — | 12.3 | No fracture | 17.3 | pale yellow |
| 4* | 48.2 | — | 39.5 | — | 12.3 | 13.1 | 0.8 | pale yellow |
| 5* | 48.2 | 39.5 $B/V_2$ | — | — | 12.3 | 44.9 | 1.4 | brown |
| 6* | 47.8 | — | 39.1 | 0.9 $MSA^1$ | 12.2 | 30–60+ | 1.2–3.7+ | brown |
| 7 | 54.5 | 18.2 $B_1$ | 18.2 | — | 9.1 | No fracture | 16.5 | pale yellow |
| 8 | 52.6 | 17.5 $B_1$ | 8.8 | 8.8 | 12.3 | No fracture | 19.2 | almost white |
| 9 | 61.4 | 17.5 $B_1$ | — | 8.8 | 12.3 | No fracture | 18.7 | almost white |

*Comparative Examples
+ Greatly fluctuating measured values
[1]In these Examples, maleic anhydride was used instead of polystyrene.

The results in Table 1 show that the novel molding materials which contain the modified polyphenylene ethers possess very good impact strength and notched impact strength and only a pale color in comparison with known molding materials.

EXAMPLES 10 TO 18

Preparation of modified polyphenylene ether B $B_2$: 99.1% by weight of poly-(2,6-dimethyl-1,4-phenylene ether) having a relative viscosity of 0.60 (measured in 1% strength by weight solution in $CHCl_3$ at 25° C.), 0.84% by weight of N-phenylmaleimide and 0.06% by weight of a free radical initiator (as for B1) were metered into a twin-screw extruder (ZSK 53 from Werner & Pfleiderer), melted in a first zone with the use of kneading elements at 280° C., then reacted in a second zone with kneading and with the use of backward-conveying kneading elements at 270° C. and then devolatilized in a devolatilization zone at 280° C. by reducing the pressure. The mean residence time in the extruder was 2 minutes. The extruded melt was passed through a water bath, granulated and dried. The content of N-phenylmaleimide measured in a film by IR spectroscopy was 0.6% by weight.

$B_3$: 88% by weight of PPE (as for $B_3$), 10% by weight of polystyrene (as for $B_1$, Examples 1 to 20), 1.97% by weight of N-phenylmaleimide and 0.03% by weight of a free radical initiator (as for $B_1$) were reacted as described in the case of ($B_2$). The N-phenylmaleimide content was 1.0% by weight.

$B/V_3$: For comparison, a modified PPE was prepared from 99.1% by weight of poly-(2,6-dimethyl-1,4-phenylene ether) (as for $B_2$) and 0.9% by weight of N-phenylmaleimide in the manner described for $B_2$.

For the preparation of the novel molding materials, components (A) to (E) were mixed in a twin-screw extruder at 280° C. and the resulting molding material was granulated and dried.

The components A, C, D and E were the same as those in Examples 1 to 9.

Comparative Examples 11, 14 and 16 were prepared without component $B_2$ or $B_3$, and Comparative Example 17 was prepared using component $B/V_3$.

The composition of the individual molding materials and the results of the impact strength and notched impact strength measurements are shown in Table 2.

TABLE 2

| Example No. | % by weight | | | | | DIN 53453 Impact strength kJ/m² (23° C.) | DIN 53453 Notched impact strength kJ/m² (23° C.) |
|---|---|---|---|---|---|---|---|
| | PA $A_1$ | mod. PPE B | PPE $C_1$ | PS D | Rubber E | | |
| 10 | 50 | 50 $B_2$ | — | — | — | 25.3 | 4.4 |
| 11* | 50 | — | 50 | — | — | 7.1 | 0.2 |
| 12 | 47.8 | 39.1 $B_2$ | — | — | 13.1 | No fracture | 16.3 |
| 13 | 50 | 22.7 $B_2$ | 18.2 | — | 9.1 | No fracture | 10.4 |
| 14* | 50 | — | 40.9 | — | 9.1 | 10.1 | 0.9 |
| 15 | 65.4 | 28.1 $B_3$ | — | — | 6.5 | 83.7 | 7.0 |
| 16* | 65.4 | — | 28 | — | 6.5 | 8.1 | 0.8 |
| 17* | 72.8 | 18.2 $B/V_3$ | — | 4.5 | 4.5 | 65.2 | 4.8 |
| 18 | 65.6 | 8.2 $B_3$ | — | 16.4 | 9.8 | No fracture | 8.1 |

*Comparative Examples

These Examples too clearly show that the novel molding materials have particularly good impact strength and notched impact strength compared with known molding materials.

EXAMPLES 19 TO 26

Preparation of modified polyphenylene ether B $B_4$: 96% by weight of poly-(2,6-dimethyl-1,4-phenylene ether) having a relative viscosity of 0.57 (measured on a 1% strength by weight solution in CHCl$_3$ at 25° C.), 3.92% by weight of methacrylamide and 0.08% by weight of a free radical initiator (as for $B_1$) were metered into a twin-screw extruder (ZSK 53 from Werner & Pfleiderer), melted in a first zone with the use of kneading elements at 270° C., reacted in a second zone with kneading and with the use of backward-conveying kneading elements at 270° C. and then devolatilized at 280° C. in a devolatilization zone by reducing the pressure. The mean residence time in the extruder was 3 minutes. The emerging melt was passed through a water bath and granulated. The methacrylamide content in the resin, determined in a pressed film by IR spectroscopy, was 1.8% by weight.

$B_5$: 84% by weight of PPE (as for $B_4$), 8% by weight of polystyrene (as for $B_1$), 7.95% by weight of methacrylamide and 0.05% by weight of a free radical initiator (as for $B_1$) were reacted at 280° C. in the manner described for $B_4$. The methacrylamide content of the resin was 3.1% by weight.

$B/V_4$: 64% by weight of PPE (as for $B_5$), 30% by weight of polystyrene, 5% by weight of N-(n-butyl)-methacrylamide and 1% by weight of dicumyl peroxide were reacted as for the preparation of $B_4$. The content of N-(n-butyl)-methacrylamide was 2.3% by weight.

For the preparation of the novel molding materials, the components $B_4$ and $B_5$ were mixed with the following components A, C, D and E at 280° C. in a twin-screw extruder, the molding material was granulated and the granules were processed to moldings by injection molding.

Component $A_2$:

Nylon 6 (polycaprolactam) having a weight average molecular weight of 34,000.

Component $C_2$:

Poly-(2,6-dimethyl-1,4-phenylene ether) having a relative viscosity of 0.57 (measured in a 1% strength by weight solution in CHCl$_3$ at 25° C.).

Components D and E

These components were the same as the components used in Examples 1 to 20.

The composition of the individual materials and the results of the impact strength and notched impact strength measurements are shown in Table 3.

TABLE 3

| Example No. | % by weight | | | | | DIN 53453 Impact strength kJ/m² (23° C.) | DIN 53453 Notched impact strength kJ/m² (23° C.) |
|---|---|---|---|---|---|---|---|
| | PA $A_2$ | mod. PPE B | PPE $C_2$ | PS D | Rubber E | | |
| 19 | 53.6 | 35.7 $B_4$ | — | — | 10.7 | No fracture | 12.7 |
| 20* | 53.6 | — | 35.7 | — | 10.7 | 18.2 | 1.2 |
| 21 | 50.8 | 33.9 $B_4$ | 8.5 | — | 6.8 | No fracture | 10.6 |
| 22 | 45.4 | 45.4 $B_5$ | — | — | 9.2 | No fracture | 11.5 |
| 23* | 45.4 | — | 45.4 | — | 9.2 | 12.4 | 1.6 |
| 24* | 45.4 | — | 40.9 | 4.5 | 9.2 | 15.3 | 2.4 |
| 25 | 31.7 | 39.7 $B_4$ | 7.9 | 15.9 | 4.8 | 86.6 | 6.3 |
| 26* | 42.0 | 34.9 $B/V_4$ | — | 12.8 | 10.3 | 83.6 | 6.5 |

*Comparative Examples without the modified PPE

EXAMPLES 27 TO 34

Preparation of modified polyphenylene ether B $B_6$: 97 g (≅97% by weight) of poly-(2,6-dimethyl-1,4-phenylene ether) ($b_1$), having a relative viscosity of 0.59, measured in 1% strength by weight solution in CHCl$_3$ at 25° C., 2.96 g (≅2.96% by weight) of N-methylacryloyle-caprolactam ($b_3$) and 0.04% by weight of the free radical initiator used for $B_1$ were metered into a twin-screw extruder (ZSK 53 from Werner & Pfleiderer), melted in a first zone with the use of kneading elements at 270° C., then reacted in a second zone with kneading and with the use of backward-conveying kneading elements at 270° C., and then devolatilized in a devolatilization zone at 280° C. by reducing the pressure. The mean residence time in the extruder was 3 minutes. The emerging melt was passed through a water bath, granulated and dried. The content of N-methacryloyl-ε-caprolactam in the polyphenylene ether resin was determined as 1.4% by weight by IR spectroscopy.

B/V$_5$: 86 g of poly-(2,6-dimethyl-1,4-phenylene ether) (as used in the preparation of B$_1$), 10 g of polystyrene (PS 144 C from BASF AG, melt flow index (MFI) at 200° C./5 kg load=24 g/10 min), 2 g of N-methacryloyl-ε-caprolactam and 2% by weight of the free radical initiator used for B$_1$ were reacted in the same manner as in the preparation of B1, at 280° C. The content of N-methacryloyl-ε-caprolactam in the PPE resin was 0.9% by weight.

For the preparation of the novel molding materials, the modified polyphenylene ether B$_6$ was mixed with the components A, C, D and E in a twin-screw extruder at 280° C., the molding material was granulated and the granules were processed to moldings by injection molding.

The following components A, C, D and E were used.

Component A:

Here, polyamide A$_2$ from Examples 30 to 37 was used.

Component C$_3$:

Poly-(2,6-dimethyl-1,4-phenylene ether) having a relative viscosity of 0.59, measured in 1% strength by weight solution in CHCl$_3$ at 25° C.

The components D and E were the same as those in Examples 1 to 20.

The composition of the individual molding materials and the results of the impact strength and notched impact strength measurements are shown in Table 4.

EXAMPLES 35 TO 42

Preparation of modified polyphenylene ether B

B$_7$: 94% by weight of poly-(2,6-dimethyl-1,4-phenylene ether) (PPE), having a relative viscosity of 0.55, measured in 1% strength by weight solution in CHCl$_3$ at 25° C., 5% by weight of polystyrene (MFI at 200° C. and 5.0 kg load=24 g/10 min), 0.95% by weight of monoethyl maleate and 0.05% by weight of the free radical initiator used for B$_1$ were introduced into a twin-screw extruder and melted in a first zone at 280° C. In a second zone, the reaction was carried out with kneading and with the use of backward-conveying kneading elements at 280° C., and the product was then devolatilized in a devolatilization zone at 280° C. by reducing the pressure. The mean residence time in the extruder was 3.5 minutes. The extruded melt was passed through a water bath and then granulated and dried.

B/V$_6$: 68.7% by weight of PPE, 30.6% by weight of polystyrene (both as for B$_{10}$) and 0.7% by weight of monoisopropyl maleate were reacted as described for B10.

The following components A, C, D and E were used:

Component A:

Here, component A$_1$ from Examples 1 to 20 was used.

Component C$_4$:

Poly-(2,6-dimethyl-1,4-phenylene ether) having a relative viscosity of 0.55, measured in 1% strength by weight solution in CHCl$_3$ at 25° C.

Components D and E:

Components D and E were the same as those in Examples 1 to 20.

Components A to E were mixed in a twin-screw extruder at 280° C., the molding material was granulated and the granules were processed to moldings by injection molding.

The composition of the molding materials and the results of the measurements are shown in Table 5.

TABLE 4

| | % by weight | | | | DIN 53453 | DIN 53453 |
|---|---|---|---|---|---|---|
| Example No. | PA A$_2$ | mod. PPE B | PPE C$_3$ | PS D | Rubber E | Impact strength kJ/m$^2$ (23° C.) | Notched impact strength kJ/m$^2$ (23° C.) |
| 27 | 50.9 | 41.7 B$_6$ | — | — | 7.4 | No fracture | 11.6 |
| 28* | 50.9 | — | 41.7 | — | 7.4 | 12.6 | 0.9 |
| 29 | 49.1 | 22.3 B$_6$ | 17.9 | — | 10.7 | 85.3 | 9.9 |
| 30 | 50 | 31.8 B$_6$ | — | 9.1 | 9.1 | No fracture | 10.2 |
| 31* | 60 | 40 B/V$_5$ | — | — | — | 24 | 1.7 |
| 32* | 60 | — | 40 | — | — | 5.6 | 0.3 |
| 33 | 54.5 | 36.4 B$_6$ | — | — | 9.1 | 77.1 | 7.3 |
| 34* | 59.1 | 18.2 B/V$_5$ | 13.6 | — | 9.1 | 60.1 | 4.8 |

*Comparative Examples

The results of these Examples too show the advantageous properties of the novel molding materials in comparison with known molding materials.

TABLE 5

| (All percentages are by weight) | | | | | |
|---|---|---|---|---|---|
| Example No. | PA A$_1$ | mod. PPE B | PPE C$_4$ | PS D | Rubber E | Notched impact strength DIN 53453 kJ/m$^2$ (23° C.) |
| 35 | 55 | 45 B$_7$ | — | — | — | 3.9 |
| 36* | 55 | — | 45 | — | — | 0.4 |
| 37 | 45.0 | 45 B$_7$ | — | — | 10.0 | 18.1 |
| 38 | 54.5 | 18.2 B$_7$ | 18.2 | — | 9.1 | 11.0 |
| 39* | 54.5 | — | 36.4 | — | 9.1 | 0.4 |
| 40 | 51.9 | 33 B$_7$ | — | 9.4 | 5.7 | 9.8 |
| 41* | 51.9 | — | 33.0 | 9.4 | 5.7 | 0.7 |

TABLE 5-continued (All percentages are by weight)

| Example No. | PA A₁ | mod. PPE B | PPE C₄ | PS D | Rubber E | Notched impact strength DIN 53453 kJ/m² (23° C.) |
|---|---|---|---|---|---|---|
| 42* | 45.5 | 45.5 B/V₆ | — | — | 9.0 | 5.8 |

*Comparative Examples

EXAMPLE 43 (Comparison Examples)

47.8% by weight of nylon (A₁), 38.8% by weight of PPE (C₄), 12.9% by weight of rubber (E) and 0.5% by weight of maleic anhydride were mixed as described in Example 35. The granules obtained were difficult to process.

EXAMPLE 44 (Comparative Example)

42.6% by weight of polyamide (A₁), 38.6% by weight of PPE (C₄), 12.8% by weight of rubber (E) and 1% by weight of a styrene/maleic anhydride copolymer (molar ratio 1:1) were mixed as described in Example 35. The granules were difficult to process.

EXAMPLES 45 TO 54

Component A

A₃: Nylon 4,6
A₄: Polycaprolactam having a weight average molecular weight of 38,000
A₅: Polyhexamethyleneadipamide having a weight average molecular weight of 33,000.

Component B

Here, components B₁ (described in Examples 1 to 9) and B₇ (described in Examples 35 to 42) were used.

Component C

C₅: Poly-(2,6-dimethyl-1,4-phenylene ether) having a relative viscosity of 0.53, measured in 1% strength by weight solution in CHCl₃ at 25° C.

Components D and E

Here, the components used were the same as those in Examples 1 to 9.

For the preparation of the novel molding materials, the components were mixed in the ratios stated in Table 7 in a twin-screw extruder at 310° C.; the mean residence time was 2.5 minutes. Thereafter, the mixture was extruded and granulated and the granules were processed to moldings by injection molding.

The results of the notched impact strength measurements (according to DIN 53,453) and the color are likewise shown in Table 7.

TABLE 7

| Example No. | % by weight | | | | | DIN 53453 | |
|---|---|---|---|---|---|---|---|
| | PA | mod. PPE B | PPE C₅ | PS D | Rubber E | Notched impact strength kJ/m² (23° C.) | Natural color |
| 45 | 47.8 A₃ | 34.8 B₁ | 4.3 | — | 13.1 | 20 | almost white |
| 46 | 47.8 A₄ | 34.8 B₁ | 4.3 | — | 13.1 | 15 | pale yellow |
| 47 | 47.8 A₅ | 34.8 B₁ | 4.3 | — | 13.1 | 12.8 | yellow |
| 48 | 53.7 A₃ | 28.9 B₇ | 2.5 | — | 14.9 | 21.7 | almost white |
| 49 | 53.7 A₅ | 28.9 B₇ | 2.5 | — | 14.9 | 14.3 | yellow |
| 50 | 50.0 A₃ | 16.7 B₇ | 16.7 | — | 16.6 | 20.9 | almost white |
| 51 | 50.0 A₅ | 16.7 B₇ | 16.7 | — | 16.6 | 13.0 | medium yellow |
| 52 | 40.7 A₃ | 40.7 B₁ | — | 0.8 | 17.8 | 26.0 | almost white |
| 53 | 50.0 A₃ | 25.0 B₁ | 8.2 | — | 16.7 | 23.5 | almost white |
| 54 | 42.4 A₃ | 21.2 B₇ | 21.2 | — | 15.2 | 19.4 | almost white |

We claim:

1. A thermoplastic molding material containing, as essential components,
   (A) 5–95% by weight of a polyamide,
   (B) 5–95% by weight of a modified polyphenylene ether, prepared from
   (b₁) 4.95–99.9% by weight of a polyphenylene ether,
   (b₂) 90% or less by weight of a vinylaromatic polymer,
   (b₃) 0.05 –10% by weight of
   (b₃₁) an α,β-unsaturated dicarbonyl compound,
   (b₄) 0–80; by weight of further graft-active monomers and
   (b₅) 0.01–0.09% by weight of a free radical initiator.

2. A thermoplastic molding material as defined in claim 1, which contains
   (A) 5–95% by weight of a polyamide,
   (B) 5–95% by weight of a modified polyphenylene ether, prepared from
   (b₁) 4.95–99.9% by weight of a polyphenylene ether,
   (b₂) 90% or less by weight of a vinylaromatic polymer,
   (b₃) 0.05–10% by weight of fumaric acid,
   (b₄) 0–80% by weight of further graft-active monomers and
   (b₅) 0.02–0.08% by weight of a free radical initiator.

3. A thermoplastic molding material as defined in claim 1, wherein the free radical initiator (b₅) is selected from the group consisting of organic hydroperoxides or highly branched alkanes.

4. A thermoplastic molding material as defined in claim 1, wherein the polyamide A) consists of not less than 80% by weight of repeating units of the formula V

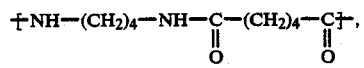

* * * * *

UNITED STATES PATENT AND TRADEMARK OFFICE
CERTIFICATE OF CORRECTION

PATENT NO. : 4,957,965

DATED : September 18, 1990

INVENTOR(S) : Christof TAUBITZ et al

It is certified that error appears in the above-identified patent and that said Letters Patent is hereby corrected as shown below:

Claim 3, Column 18, line 54, "radical" should read -"radical"-.

Signed and Sealed this

Seventh Day of April, 1992

Attest:

HARRY F. MANBECK, JR.

*Attesting Officer*  *Commissioner of Patents and Trademarks*